Aug. 12, 1958 A. ELLETT 2,847,501

SUBSCRIPTION TELEVISION SYSTEM

Filed Feb. 6, 1952 2 Sheets-Sheet 1

INVENTOR.
ALEXANDER ELLET
BY Francis W. Crotty
HIS ATTORNEY.

SUBSCRIPTION TELEVISION SYSTEM

*INVENTOR:*
ALEXANDER ELLETT
*BY* Francis W. Crotty
HIS ATTORNEY.

United States Patent Office 2,847,501

Patented Aug. 12, 1958

2,847,501

SUBSCRIPTION TELEVISION SYSTEM

Alexander Ellett, River Forest, Ill., assignor to Zenith Radio Corporation, a corporation of Delaware Application February 6, 1952, Serial No. 270,173

10 Claims. (Cl. 178—5.1)

Figure 1:
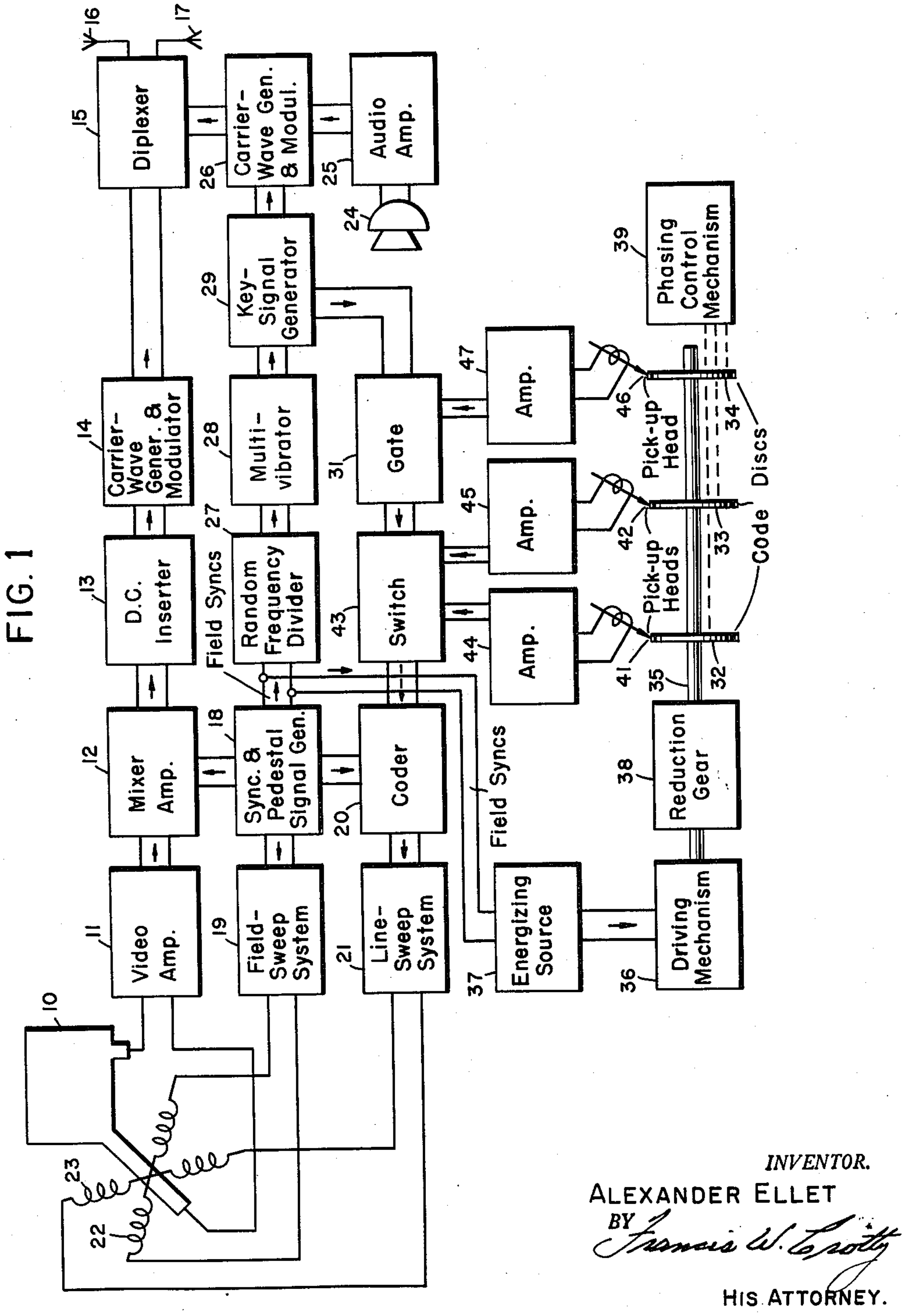

This invention relates to subscription television systems in which a television signal, transmitted in coded form, is utilized by subscriber receivers equipped with suitable apparatus for decoding that signal.

Since the invention may be practiced in either a transmitter or receiver, the term "encoding" is used herein in its generic sense to encompass either coding at the transmitter or decoding at the receiver.

Coding of the television signal in such systems may be effected by apparatus which responds to an actuating signal and changes the mode of operation of the transmitter in accordance with a coding schedule established by the actuating signal. The actuating signal may be produced by the recurrent scansion of a code record having selected coding information recorded thereon. Such a record may take any of a variety of forms; it may be a magnetic tape or disc bearing a recorded coding schedule to be scanned recurrently by a pick-up head, a notched disc having a pattern of notches representing a coding schedule to be scanned by a reluctance type pick-up head, or it may comprise an apertured card or other type of record storing device to be read by a scanning beam. In some subscription systems a similar record, having coding information identical to that controlling the transmitter, is included in each subscriber receiver to be scanned in synchronism with the scansion of the code record at the transmitter to produce a decoding signal. The decoding signal is utilized to actuate decoding apparatus which produces compensating variations in the mode of operation of the receiver to decode the subscription signal and reproduce the intelligence represented thereby.

As pointed out in copending application Serial No. 254,099, filed October 31, 1951, in the name of the present inventor, entitled "Subscription Television System," and assigned to the present assignee, and now Pat. No. 2,770,803, granted November 13, 1956, the coding schedule of such systems is repetitive, making it possible for an unauthorized person to examine the radiated signal and discover the coding schedule for use in decoding the television signal. The ease with which the code may be deciphered depends upon the length and complexity of the coding cycle. In the usual case, limitations imposed by such factors as the physical size of the code record so restrict the coding cycle that it is difficult to achieve a coding schedule sufficiently long or complex adequately to protect against unauthorized examination and utilization of the subscription signal.

The improved system disclosed in the aforementioned application represents one solution to this problem. In that system, the coding schedule of the radiated television signal is obtained collectively from a plurality of code records each of which represents a selected coding schedule. Appropriate means are provided for repeatedly scanning the individual code records, and a selecting mechanism impresses the coding signals derived from such records upon the coding apparatus and in a particular sequence or order. The selecting mechanism itself is actuated in accordance with a selecting schedule which determines the order in which the signals from the several code records are employed to actuate the coding apparatus. A key signal, representing this selecting schedule, may be disseminated to the various subscriber receivers to control a similar arrangement of several code records and a selecting mechanism to accomplish decoding.

In such a system the actual coding schedule of the radiated television signal is sufficiently long to render it exceedingly difficult to determine that schedule from an examination of the telecast signal. This obtains since the television signal is, in effect, coded by a sequence or combination of repeating coding schedules, and that sequence is determined by a further schedule referred to herein as a selecting schedule.

The system of the present invention is of the same general type, but the selecting schedule is periodically interrupted to add further to the complexity of the coding schedule. That is, the signal for actuating the selecting mechanism is interrupted from time to time in accordance with what shall be termed a control schedule. When the selecting signal is interrupted, the selecting mechanism remains in one operating position and the selecting process is discontinued until the selecting signal is again applied thereto. In the present system, the various individual coding signals and selecting signal are preferably generated locally at the subscription transmitter and various receivers, while a key signal representing the control schedule is disseminated to such receivers concurrently with the television signal.

It is, therefore, an object of the present invention to provide an improved subscription television system in which the coding schedule of the television signal has such complexity as to render unauthorized utilization thereof extremely difficult if not virtually impossible.

A further object of the invention is to provide an improved subscription television system in which the coding schedule is highly complex, and yet which uses relatively simple code records.

A subscription television system, constructed in accordance with the invention, comprises means for supplying a television signal and encoding apparatus coupled to this means and responsive to characteristic variations of an applied signal for effectively encoding the television signal. Means are provided for deriving a plurality of individual encoding signals respectively having characteristic variations occurrng at intervals determined by different predetermined coding schedules independent of and unrelated to each other. A selecting device having a plurality of discrete operating conditions develops a final encoding signal comprising characteristic variations from each of the individual encoding signals in accordance with actuation of the selecting device between the discrete operating conditions and applies the final encoding signal to the encoding apparatus. A first control means is coupled to the selecting device for actuating the device between its operating conditions in accordance with a selecting schedule having a random characteristic to actuate the encoding apparatus in accordance with one of the predetermined coding schedules during certain time intervals and in accordance with another of the coding schedules during intervening time intervals as determined by the selecting schedule. A second control means controls the first control means effectively to disassociate the first control means from the selecting device during spaced operating intervals. Finally, means are provided for actuating the second control means in accordance with a random control schedule.

Figure 2:
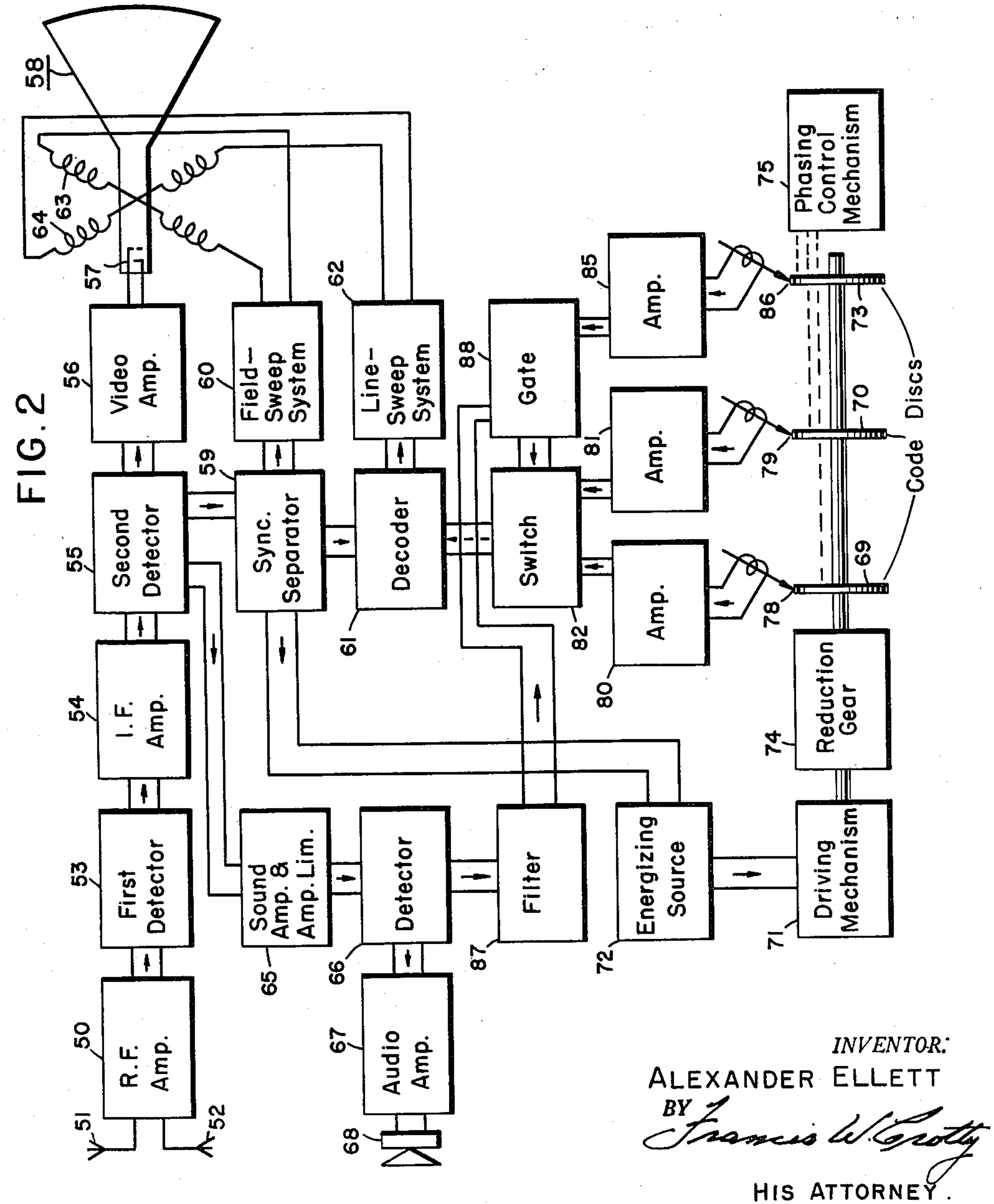

The features of this invention which are believed to be new are set forth with particularity in the appended claims. The invention itself, however, together with further objects and advantages thereof may best be understood by reference to the following description when taken in conjunction with the accompanying drawings, in which:

Figure 1 represents a transmitter constructed in accordance with one embodiment of the invention, and, Figure 2 represents a receiver for operation in conjunction with the transmitter.

The transmitter of Figure 1 includes a picture-converting device 10 which may be an iconoscope, image-orthicon or other well-known type for converting the shade values of a scene to be televised into a video signal for application to the input circuit of a video amplifier 11 of one or more stages. The output circuit of amplifier 11 is connected to a mixer amplifier 12, which in turn, is connected through a direct-current inserter 13 to a carrier-wave generator and modulator 14. The output terminals of modulator 14 are connected to a diplexer 15 having output terminals coupled to an appropriate antenna circuit 16, 17.

The transmitter also includes a synchronizing and blanking pedestal signal generator 18 which develops line- and field-synchronizing pulses and associated blanking pedestals. Generator 18 is connected to mixer amplifier 12, to a field-sweep system 19 and through a coder 20 to a line-sweep system 21. The output terminals of sweep systems 19 and 21 are connected respectively to the field-deflection elements 22 and line-deflection elements 23 associated with device 10.

A sound transducer or microphone 24 converts the sound intelligence associated with the televised scene into an audio signal which is applied to an audio amplifier 25 of any desired number of stages. The output terminals of amplifier 25 are connected to a carrier-wave generator and modulator 26 which, in turn, is connected through diplexer 15 to antenna 16, 17.

Generator 18 is also connected to a frequency divider 27 which may be of the random type disclosed in copending application Serial No. 32,457, filed in the name of Erwin M. Roschke on June 11, 1948, issued March 11, 1952, as Patent 2,588,413, entitled "Random Frequency Divider" and assigned to the present assignee. The output terminals of the frequency divider are connected to an Eccles-Jordan multivibrator 28. That is, multivibrator 28 has two stable operating conditions and may be triggered between these conditions by successive pulses of like polarity. Multivibrator 28 is connected to a key-signal generator 29 and turns the generator on whenever the multivibrator is in a selected one of its two operating conditions. The key-signal generator is coupled to modulator 26 and impresses a burst of key signal on the modulator during operating intervals when it is turned on by the multivibrator. The frequency of the key signal is preferably outside of the audible range so that the key signal does not interfere with the audio intelligence applied to modulator 26. Further output terminals of key-signal generator 29 are connected to a control network or gate 31.

The transmitter additionally includes at least two code records 32 and 33 which may be discs bearing code information magnetically recorded about their peripheries in the form of irregularly spaced pulses. The duration and spacing of the pulses recorded on disc 32 represent one selected coding schedule, while the duration and spacing of the pulses recorded on disc 33 represent a second selected coding schedule. A further disc 34 has a further series of irregularly spaced pulses magnetically recorded about its periphery to represent a prescribed selecting schedule. Discs 32, 33 and 34 are concurrently rotated on a common drive shaft 35 by means of a driving mechanism 36 energized from a source 37 connected to generator 18 for synchronizing purposes. It is preferred that a reduction gear 38 be interposed between driving mechanism 36 and drive shaft

35 in order that the discs may be rotated at a speed synchronized with the field-scanning frequency of the system but at a submultiple of this frequency. Moreover, when so desired additional reduction gears may be interposed between each of the discs so that each may be rotated at a different speed corresponding to different submultiples of the field-scanning frequency. The discs may be frictionally mounted on the drive shaft and their angular positions on the shaft controlled by a phasing control mechanism 39 in the manner described in copending application Serial No. 268,966, filed in the name of Erwin M. Roschke on January 30, 1952, and issued June 25, 1957, as Patent 2,797,260, entitled "Subscription Television System," and in copending application Serial No. 270,557, filed in the name of George V. Morris on February 8, 1952, and issued June 4, 1957, as Patent 2,794,851, both of which are assigned to the present assignee.

Discs 32 and 33 have pick-up heads 41 and 42 respectively associated therewith, the pick-up heads being connected to an electronic switch or selecting device 43 through amplifiers 44 and 45. An additional pick-up head 46 is associated with disc 34 and is coupled through an amplifier 47 to the further input terminals of gate circuit 31.

In operation, device 10 transforms the shade values of the scene to be televised into a video signal which is amplified in video amplifier 11. The amplified signal is combined in mixer 12 with line- and field-synchronizing pulses and associated pedestals derived from generator 18 to produce a composite television signal at the output terminals of the mixer. The television signal is appropriately adjusted as to background level by D.-C. inserter 13 and, in accordance with present day standards, is amplitude modulated on a picture carrier in unit 14 and applied to antenna circuit 16, 17 through diplexer 15.

Generator 18 supplies field-drive pulses to field-sweep system 19 to synchronize the field scansion of device 10. Similarly, it supplies line-drive pulses to line-sweep system 21 to synchronize the line scansion of the device. However, coder 20 which is interposed between the line-sweep system and the generator is controlled by a coding signal applied thereto from switch 43 to vary, from time to time, the timing of the line-drive pulses as applied to the line-sweep system. This causes a related variation in the line scansion of device 10 and a corresponding variation in the timing of the video components of the television signal developed by mixer 12 relative to its line-synchronizing components which are obtained directly from generator 18. In this manner the radiated television signal may be considered to be effectively coded since it is not susceptible to intelligent reproduction in a standard television receiver because such receivers depend upon an invariable timing between the various components of the received program signal. The sound intelligence accompanying the televised scene is converted into an audio signal by device 24 and amplified in audio amplifier 25. The amplified audio signal, in accordance with present-day standards, is frequency modulated on an appropriate sound carrier in modulator 26 and the modulated sound carrier is applied to antenna circuit 16, 17 through diplexer 15 in well-known fashion. The resulting signal radiated by the antenna includes a coded, amplitude-modulated picture carrier, and a frequency-modulated sound carrier displaced therefrom by a selected amount.

Control of coder 20 to achieve coding of the radiated television signal is accomplished in the following manner: The rotation of magnetic discs 32 and 33 causes pick-up heads 41 and 42 to develop a pair of coding signals individually comprising a series of irregularly timed pulses representing the recorded coding schedule of its associated disc and repeating at the scanning rate of its disc. The records on discs 32 and 33 are preferably such that when the discs are rotated at their prescribed speeds, the pulse components of the derived coding signals have a time separation representing several field periods and have a duration also corresponding to several field periods. These coding signals, after amplification in amplifiers 44 and 45 are concurrently applied to electronic switch 43 which is actuated by the signal derived from gate 31 to impress first one and then the other on coder 20. The coder responds to the applied actuating signal and alters, for the duration of each pulse component thereof, the timing of the line-drive pulses applied to line-sweep system 21 and, therefore, the relative timing between the video and line-synchronizing components for the duration of such pulse components. By way of illustration, it may be assumed that coder 20 translates line-drive pulses from generator 18 to line-sweep system 21 without any change in timing in the absence of an applied actuating pulse. It may further be considered that the coder introduces a time delay in the presence and for the duration of each pulse component of the applied coding signal. It is then clear that the coding system varies the timing of the line-sweep system in accordance with a schedule represented by the pulse components of the coding signal obtained from switch 43. It is evident that switch 43 may take the form of a multi-position selector which, under the control of the signal from gate 31, selectively applies any number of derived coding signals to coder 20. Moreover, it may effect any desired combination of the individual derived coding signals in its various positions to apply a final coding signal to the coder.

As previously stated, switch 43 determines which of the two individual coding signals from amplifiers 44 and 45 is to be impressed at any operating instant on coder 20 to form the coding signal for the coder. The switch is actuated in accordance with a selecting signal derived by pick-up head 46 and applied to the switch from amplifier 47 and through gate 31, the selecting signal consisting of a repeating sequence of pulse components representing the selecting schedule recorded on disc 34.

In order to complicate further the coding schedule of the radiated television signal, the application of the selecting signal from amplifier 47 to switch 43 is periodically interrupted by actuation of gate 31. During operating intervals when gate 31 interrupts the selecting signal, switch 43 remains in the condition prevailing at the time the gate is actuated applying one or the other of the individual coding signals from amplifier 44 or 45 to coder 20. The times of interruption of the selecting signal are established in the following manner: Field-synchronizing pulses from generator 18 are frequency divided in divider 27 and actuate multivibrator 28 from one to the other of its stable operating conditions. The multivibrator turns on key-signal generator 29 when it is in one of its operating conditions so that bursts of key signal are impressed on gate 31 during spaced intervals determined by a control schedule established by divider 27. Whenever the gate circuit is actuated by the key-signal bursts, the application of the selecting signal upon switch 43 is discontinued for an interval corresponding to the duration of each burst but upon the termination of each such burst the selecting signal resumes its control of switch 43. The bursts of key signal from generator 29 are modulated on the sound carrier in modulator 26 so that information concerning the control or interrupting schedule is disseminated to subscriber receivers.

The resultant coding schedule developed by discs 32, 33 and 34 may be varied at will from time to time by control mechanism 39 which adjusts the discs to various preselected relative angular positions on drive shaft 35, to control the relative phase of the coding signals derived from discs 32 and 33 and the selecting signal derived from disc 34.

The various units of the transmitter, with the exception of mechanism 39, are either extremely well-known to the television art or are described in detail in Patent 2,547,598 to Roschke, issued April 3, 1951, entitled "Subscription Image Transmission System and Apparatus" and assigned to the present assignee. Suitable constructions for mechanism 39 are fully described in the aforementioned copending applications Serial Nos. 268,966 and 270,557. Because of this, and since the particular circuitry of these elements forms no part of the present invention, a more detailed description thereof is deemed to be unnecessary and has been omitted to simplify an understanding of the invention.

The receiver of Figure 2 comprises a radio-frequency amplifier 50 of any desired number of stages having input terminals connected to an antenna circuit 51, 52 and output terminals connected to a first detector 53. The first detector is coupled to an intermediate-frequency amplifier 54 of one or more stages which, in turn, is coupled to a second detector 55. The second detector is connected through a video amplifier 56 to the input electrodes 57 of a cathode-ray image-reproducing device 58. Second detector 55 is also connected to a synchronizing-signal separator 59 which, in turn, is coupled to a field-sweep system 60 and through a decoder 61 to a line-sweep system 62. The output terminals of sweep systems 60 and 62 are connected respectively to the field-deflection elements 63 and line-deflection elements 64 associated with device 58. Assuming the receiver to be of the inter-carrier sound type, second detector 55 is also coupled to a sound amplifier and amplitude limiter 65 which is coupled through a sound detector 66 and audio amplifier 67 to a sound-reproducing device 68.

The receiver further comprises a pair of magnetic discs 69 and 70 respectively bearing code patterns identical to those of discs 32 and 33 at the transmitter. Discs 69 and 70 are rotated by a drive mechanism 71 which is energized by a suitable energizing source 72 coupled to synchronizing-signal separator 59 for synchronizing purposes. A further disc 73 having a selecting pattern recorded thereon identical to the pattern of disc 34 at the transmitter is driven together with discs 69 and 70 on a common drive shaft for concurrent rotation. Reduction gear 74 is interposed between the drive shaft and drive mechanism 71 and has a selected reduction ratio so that discs 69, 70 and 73 rotate at speeds identical to the speeds of the corresponding discs at the transmitter. Discs 69, 70 and 73 are frictionally mounted on the drive shaft, and their relative angular positions on the shaft may be adjusted by phasing control mechanism 75 to be identical at all times to the angular position of the various transmitter discs on drive shaft 35. As fully described in the aforementioned copending applications Serial Nos. 268,966 and 270,557, the phasing control mechanism may produce the proper setting of discs 69, 70 and 73 automatically under the control of a control signal from the transmitter or distribution center.

Discs 69 and 70 respectively have pick-up heads 78, 79 associated therewith, the pick-up heads being connected to amplifiers 80 and 81. The output terminals of amplifiers 80 and 81 are connected to an electronic switch or selecting device 82 which, in turn, is connected to decoder 61. A filter circuit 87 is connected to sound detector 66 to select the aforementioned key-signal bursts, and the output terminals of this filter are connected to a gate 88. The disc 73 has a pick-up head 86 associated therewith which is connected to gate 88 through an amplifier 85.

The receiver may be tuned to utilize the subscription telecast from the transmitter of Figure 1. The radiated signal is intercepted by antenna 51, 52 and amplified in radio-frequency amplifier 50. The amplified signal is heterodyned to the selected intermediate frequency of the receiver in first detector 53, and the resulting intermediate-frequency signal is amplified in intermediate-frequency amplifier 54 and detected in second detector 55. The composite video signal from the second detector is amplified in video amplifier 56 and is then applied to the input electrodes 57 of reproducing device 58 to control the intensity of the cathode-ray beam thereof in accordance with the image intelligence.

The synchronizing components of the incoming television signal are separated out in separator 59, which applies field-synchronizing pulses to field-sweep system 60 and line-synchronizing pulses through decoder 61 to line-sweep system 62. In this manner, the sweep systems and therefore the line and field scansions of reproducing device 58 are synchronized with the incoming signal. Decoder 61 is actuated in a manner to be described to impart compensating variations in the timing of the line-synchronizing pulses applied to line-sweep system 62 so that the aforementioned variations in timing between the video and line-synchronizing components of the television signal may be corrected to enable device 58 to reproduce properly the picture intelligence.

In accordance with intercarrier sound principles, detector 55 develops an intercarrier signal, which is selected by means of an appropriate selecting network and applied to unit 65 wherein it is amplified and amplitude limited. The signal is then detected in circuit 66, amplified in audio amplifier 67, and the sound intelligence is reproduced in device 68. The aforementioned bursts of key signal representing the control or interrupting schedule of the system also appear as modulation components of the intercarrier signal and are selected by filter 87.

As previously pointed out, discs 69 and 70 respectively have code information recorded thereon identical to the code information on discs 32 and 33 of the transmitter. The receiver discs are driven in synchronism with the transmitter discs by driving mechanism 71 due to the synchronizing of energizing source 72 by field-synchronizing pulses derived from separator 59. Initial phasing of discs 69 and 70 and the transmitter discs may be accomplished, as previously mentioned, by phasing control mechanism 75. Moreover, proper phasing may be maintained by any known means, for example, the arrangement disclosed in copending application Serial No. 75,988, filed February 12, 1949, and issued October 20, 1953, as Patent 2,656,407, in the name of Roswell H. Herrick et al., entitled "Subscriber Signalling System" and assigned to the present assignee may be used to advantage. Pick-up heads 78 and 79 produce decoding signals having identical characteristics to the corresponding coding signals at the transmitter, and the decoding signals are amplified in amplifiers 80 and 81 and applied to switch 82. Likewise, pick-up head 86 produces a selecting signal having identical characteristics to the corresponding selecting signal at the transmitter, this signal being amplified in amplifier 85 and applied to switch 82 through gate 88. Moreover, the application of the selecting signal to switch 82 is interrupted periodically by gate 88 in correspondence with similar interruptions at the transmitter, during spaced intervals corresponding to each burst of key signal applied to the gate from filter 87.

Accordingly, the selecting signal actuates switch 82 so that the decoding signal from amplifier 80 or the signal from amplifier 81 is applied to decoder 61 as determined by the selecting schedule recorded on disc 73. From time to time the actuation of switch 82 is interrupted because gate 88 is operated at spaced intervals to interrupt the selecting signal. All these operations are synchronized with similar operations at the transmitter and, therefore, the timing of the line-synchronizing pulses applied to line-sweep system 62 is adjusted an appropriate amount and at the proper times by decoder 61 to control the line scansion of device 58 as to compensate the afore-described variations in the television signal.

Of course, when so desired the functions of the airborne key signal and the selecting signal may be reversed. That is, at the transmitter the key signal from generator 29 may be applied to switch 43 through gate 31 to actuate the switch; and the signal from amplifier 47 may be applied to the gate periodically to interrupt the application of the key signal to the switch.

The various units of the receiver, with the exception of decoder 61 and phasing control mechanism 75 are in themselves extremely well known to the art, and for this reason a detailed explanation of the circuitry thereof is believed to be unnecessary. The decoder 61 and control mechanism 75 may be similar in construction to the corresponding portions of the transmitter, and are described in detail either in the aforesaid Patent 2,547,598 to Roschke or in the aforesaid copending applications Serial Nos. 268,966 and 270,557.

The invention provides, therefore, an improved subscription system in which the encoding schedule of the transmitted television signal is derived from a plurality of sources (specifically separate storage devices) incorporated in the transmitter and in each subscriber receiver. As described herein, the construction of the system is such that no single device is used continuously; but each is selected at various intervals. Moreover, to increase further the coding complexity, the times of occurrence of these intervals follow a selector pattern which is interrupted from time to time enabling the cycle of the coding schedule to be infinitely long for all intents and purposes so as to preclude unauthorized utilization of the subscripton broadcast.

While a particular embodiment of the invention has been shown and described, modifications may be made, and it is intended in the appended claims to cover all such modifications as fall within the true spirit and scope of the invention.

I claim:

1. A subscription television transmitter comprising: means for supplying a television signal representing a scanned subject for transmission to subscriber receivers; a coding device coupled to said means for varying the mode of transmission of said television signal to effect coding thereof in accordance with characteristic variations of an applied signal; means for developing a plurality of individual coding signals respectively having characteristic variations occurring at intervals determined by different predetermined coding schedules independent of and unrelated to each other; a selecting device coupled to said last-mentioned means having a plurality of discrete operating conditions and responsive to an applied signal for selectively applying said coding signals to said coding device in accordance with actuation of said selecting device between said discrete operating conditions; actuating means for deriving a selecting signal representing a predetermined selecting schedule and for applying said selecting signal to said selecting device to determine the order of application of said plurality of coding signals to said coding device, whereby said coding device is actuated in accordance with one of said predetermined coding schedules during certain time intervals and in accordance with another of said coding schedules during intervening time intervals as determined by said selecting schedule; a gate circuit interposed between said actuating means and said selecting device and responsive to an applied signal for interrupting the application of said selecting signal to said selecting device during spaced operating intervals; and means for deriving a control signal representing a predetermined control schedule and for supplying said control signal to said gate circuit.

2. A subscription television transmitter comprising: means for supplying a television signal representing a scanned subject for transmission to subscriber receivers; a coding device coupled to said means for varying the mode of transmission of said television signal to effect coding thereof in accordance with characteristic variations of an applied signal; means for developing a plurality of individual repetitive coding signals respectively having characteristic variations occurring at intervals determined by different predetermined coding schedules independent of and unrelated to each other; a selecting device coupled to said last mentioned means having a plurality of discrete operating conditions and responsive to an applied signal for selectively applying said coding signals to said coding device in accordance with actuation of said selecting device between said discrete operating conditions; means for deriving a selecting signal representing a repetitive selecting schedule and for applying said selecting signal to said selecting device to determine the order of application of said plurality of coding signals to said coding device, whereby said coding device is actuated in accordance with one of said predetermined coding schedules during certain time intervals and in accordance with another of said coding schedules during intervening time intervals as determined by said selecting schedule; a control network responsive to an applied signal for controlling said selecting device to render said selecting device unresponsive to said selecting signal during spaced operating intervals; and means for supplying a control signal representing a random control schedule to said control network.

3. A subscription television transmitter comprising: means for supplying a television signal representing a scanned subject for transmission to subscriber receivers; a coding device coupled to said means for varying the mode of transmission of said television signal to effect coding thereof in accordance with characteristic variations of an applied signal; means for developing a plurality of individual coding signals respectively having characteristic variations occurring at intervals determined by different predetermined coding schedules independent of and unrelated to each other; a selecting device coupled to said last-mentioned means having a plurality of discrete operating conditions and responsive to an applied signal for selectively applying said coding signals to said coding device in accordance with actuation of said selecting device between said discrete operating conditions; means for deriving a selecting signal representing a selecting schedule and for applying said selecting signal to said selecting device to determine the order of application of said plurality of coding signals to said coding device, wherby said coding device is actuated in accordance with one of said predetermined coding schedules during certain time intervals and in accordance with another of said coding schedules during intervening time intervals as determined by said selecting schedule; a control network responsive to an applied signal for controlling said selecting device to render said selecting device unresponsive to said selecting signal during spaced operating intervals; a key-signal generator for producing a key signal representing a random control schedule and for supplying said key-signal to said control network; and means for disseminating the coded television signal and said key signal concurrently to the subscriber receivers.

4. A subscription type of television receiver for utilizing a coded television signal having its mode of transmission varied selectively in accordance with a plurality of independent and unrelated coding schedules selected under the control of a predetermined selecting schedule which is interrupted from time to time as determined by a control schedule, said receiver comprising: an image-reproducing device; circuit means for supplying said television signal to said reproducing device; a decoding device coupled to said circuit means for effectively decoding said television signal in response to characteristic variations of an applied decoding signal; means for deriving a plurality of individual decoding signals respectively having characteristic variations occurring at intervals determined by said coding schedules of said television signal; a selecting device coupled to said last-mentioned means having a plurality of discrete operating conditions and responsive to an applied signal for selectively applying said individual decoding signals to said decoding device in accordance with actuation of said selecting device between said discrete operating conditions; means for deriving a selecting signal representing said predetermined selecting schedule and for applying said selecting signal to said selecting device to determine the order of application of said individual decoding signals to said decoding device, whereby said decoding device is actuated in accordance with one of said coding schedules during certain time intervals and in accordance with another of said coding schedules during intervening time intervals as determined by said selecting schedule; a control network responsive to an applied signal for controlling said selecting device to render said selecting device unresponsive to said selecting signal during spaced operating intervals; and means for deriving a control signal representing said control schedule and for applying said control signal to said network.

5. A subscription type of television receiver for utilizing a coded television signal having its mode of transmission varied selectively in accordance with a plurality of independent and unrelated coding schedules selected under the control of a predetermined selecting schedule which is interrupted from time to time as determined by a control schedule, said receiver comprising: an image-reproducing device; circuit means for supplying said television signal to said reproducing device; a decoding device coupled to said circuit means for effectively decoding said television signal in response to characteristic variations of an applied decoding signal; means for deriving a plurality of individual decoding signals respectively having characteristic variations occurring at intervals determined by said coding schedules of said television signal; a selecting device coupled to said last-mentioned means having a plurality of discrete operating conditions and responsive to an applied signal for selectively applying said individual decoding signals to said decoding device in accordance with actuation of said selecting device between said discrete operating conditions; actuating means for deriving a selecting signal representing said predetermined selecting schedule and for applying said selecting signal to said selecting device to determine the order of application of said individual decoding signals to said decoding device, whereby said decoding device is actuated in accordance with one of said coding schedules during certain time intervals and in accordance with another of said coding schedules during intervening time intervals as determined by said selecting schedule; a gate circuit interposed between said actuating means and said selecting device and responsive to an applied signal for interrupting the application of said selecting signal to said selecting device during spaced operating intervals; and means for deriving a control signal representing said control schedule and for applying said control signal to said gate circuit.

6. A subscription type of television receiver for utilizing a coded television signal having its mode of transmission varied selectively in accordance with a plurality of independent and unrelated coding schedules selected under the control of a predetermined selecting schedule which is interrupted from time to time as determined by a control schedule, and for utilizing a key signal received concurrently with said television signal and representing said control schedule, said receiver comprising: an image-reproducing device; circuit means for supplying said television signal to said reproducing device; a decoding device coupled to said circuit means for effectively decoding said television signal in response to characteristic variations of an applied decoding signal; means for deriving a plurality of individual decoding signals respectively having characteristic variations occurring at intervals determined by said coding schedules of said television signal; a selecting device coupled to said last-mentioned means having a plurality of discrete operating conditions and responsive to an applied signal for selectively applying said individual decoding signals to said decoding device in accordance with actuation of said selecting device between said discrete operating conditions; means for deriving a selecting signal representing said predetermined selecting schedule and for applying said selecting signal to said selecting device to determine the order of application of said individual decoding signals to said decoding device whereby said decoding device is actuated in accordance with one of said coding schedules during certain time intervals and in accordance with another of said coding schedules during intervening time intervals as determined by said selecting schedule; a control network responsive to an applied signal for controlling said selecting device to render said selecting device unresponsive to said selecting signal during spaced operating intervals; and means for deriving said key signal and for applying said key signal to said control network.

7. A subscription television transmitter comprising: means for supplying a television signal representing a scanned subject for transmission to subscriber receivers; coding apparatus coupled to said means for varying the mode of transmission of said television signal to effect coding thereof in accordance with characteristic variations of an applied signal; means for developing a plurality of individual coding signals respectively having characteristic variations occurring at intervals determined by different predetermined coding schedules independent of and unrelated to each other; a selecting device coupled to said last-mentioned means and having a plurality of discrete operating conditions for developing a final coding signal comprising characteristic variations from each of said individual coding signals in accordance with actuation of said device between said discrete operating conditions for applying said final coding signal to said coding apparatus; a first control means coupled to said device for actuating said device between its operating conditions in accordance with a selecting schedule having a random characteristic to actuate said coding apparatus in accordance with one of said predetermined coding schedules during certain time intervals and in accordance with another of said coding schedules during intervening time intervals as determined by said selecting schedule; a second control means for controlling said first control means effectively to disassociate said first control means from said device during spaced operating intervals; and means for actuating said second control means in accordance with a random control schedule.

8. A subscription type of television receiver for utilizing a coded television signal having its mode of transmission varied selectively in accordance with a plurality of independent and unrelated coding schedules selected under the control of a selecting schedule having a random characteristic which is interrupted from time to time as determined by a random control schedule, said receiver comprising: an image-reproducing device; circuit means for supplying said television signal to said reproducing device; decoding apparatus coupled to said circuit means for effectively decoding said television signal in response to characteristic variations of an applied decoding signal; means for deriving a plurality of individual decoding signals respectively having characteristic variations occurring at intervals determined by said coding schedules of said television signal; a selecting device coupled to said last-mentioned means and having a plurality of discrete operating conditions for developing a final decoding signal comprising characteristic variations from each of said individual decoding signals in accordance with actuation of said device between said discrete operating conditions and for applying said final decoding signal to said decoding apparatus; a first control means coupled to said device for actuating said device between its operating conditions in accordance with said selecting schedule to actuate said decoding apparatus in accordance with one of said coding schedules during certain time intervals and in accordance with another of said coding schedules during intervening time intervals as determined by said selecting schedule; a second control means for controlling said first control means effectively to disassociate said first control means from said device during spaced operating intervals; and means for actuating said second control means in accordance with said random control schedule.

9. A subscription television system comprising: means for supplying a television signal; encoding apparatus coupled to said means and responsive to characteristic variations of an applied signal for effectively encoding said television signal; means for deriving a plurality of individual encoding signals respectively having characteristic variations occurring at intervals determined by different predetermined coding schedules independent of and unrelated to each other; a selecting device coupled to said last-mentioned means and having a plurality of discrete operating conditions for developing a final encoding signal comprising characteristic variations from each of said individual encoding signals in accordance with actuation of said device between said discrete operating conditions and for applying said final encoding signal to said encoding apparatus; a first control means coupled to said device for actuating said device between its operating conditions in accordance with a selecting schedule having a random characteristic to actuate said encoding apparatus in accordance with one of said predetermined coding schedules during certain time intervals and in accordance with another of said coding schedules during intervening time intervals as determined by said selecting schedule; a second control means for controlling said first control means effectively to disassociate said first control means from said device during spaced operating intervals; and means for actuating said second control means in accordance with a random control schedule.

10. A subscription television system comprising: means for supplying a television signal; encoding apparatus coupled to said means and responsive to characteristic variations of an applied signal for effectively encoding said television signal; means for deriving a plurality of individual encoding signals respectively having characteristic variations occurring at intervals determined by different predetermined coding schedules independent of and unrelated to each other; a selecting device coupled to said last-mentioned means having a plurality of discrete operating conditions and responsive to an applied signal for selectively applying said individual encoding signals to said encoding apparatus in accordance with actuation of said selecting device between said discrete operating conditions; means for deriving a selecting signal representing a selecting schedule having a random characteristic and for applyig said selecting signal to said selecting device to determine the order of application of said individual encoding signals to said encoding apparatus, whereby said encoding apparatus is actuated in accordance with one of said predetermined coding schedules during certain time intervals and in accordance with another of said coding schedules during intervening time intervals as determined by said selecting schedule; and control means for controlling said selecting device to render said device unresponsive to said selecting signal during spaced operating intervals determined by a random control schedule.

References Cited in the file of this patent

UNITED STATES PATENTS

| | | |
|---|---|---|
| 2,251,525 | Rosenthal | Aug. 5, 1941 |
| 2,402,058 | Loughren | June 11, 1946 |
| 2,403,059 | Dillenback et al. | July 2, 1946 |
| 2,425,616 | Hallborg et al. | Aug. 12, 1947 |
| 2,495,727 | Hutchinson | Jan. 31, 1950 |
| 2,545,770 | Ellett | Mar. 20, 1951 |
| 2,573,349 | Miller | Oct. 30, 1951 |
| 2,632,799 | Cotsworth | Mar. 24, 1953 |
| 2,656,406 | Gray et al. | Oct. 20, 1953 |
| 2,656,407 | Herrick et al. | Oct. 20, 1953 |